(12) United States Patent
Tamai et al.

(10) Patent No.: US 9,154,954 B2
(45) Date of Patent: Oct. 6, 2015

(54) PORTABLE TERMINAL AND LOCK STATE CANCELING METHOD

(75) Inventors: Naoyuki Tamai, Amagasaki (JP); Hiroki Kobayashi, Osaka (JP); Shinpei Ozako, Osaka (JP)

(73) Assignee: Kyocera Corporation, Kyoto (JP)

( * ) Notice: Subject to any disclaimer, the term of this patent is extended or adjusted under 35 U.S.C. 154(b) by 288 days.

(21) Appl. No.: 13/818,559

(22) PCT Filed: Aug. 19, 2011

(86) PCT No.: PCT/JP2011/068739
§ 371 (c)(1),
(2), (4) Date: Feb. 22, 2013

(87) PCT Pub. No.: WO2012/026395
PCT Pub. Date: Mar. 1, 2012

(65) Prior Publication Data
US 2013/0157561 A1    Jun. 20, 2013

(30) Foreign Application Priority Data

Aug. 24, 2010   (JP) ................................. 2010-186954
Sep. 27, 2010   (JP) ................................. 2010-214963

(51) Int. Cl.
*H04M 1/06*     (2006.01)
*H04W 12/08*    (2009.01)
(Continued)

(52) U.S. Cl.
CPC ........... *H04W 12/08* (2013.01); *G06F 3/04883* (2013.01); *G06F 21/36* (2013.01);
(Continued)

(58) Field of Classification Search
CPC .................. H04M 1/72577; H04M 1/772577; H04M 2250/22

USPC ........ 455/26.1, 550.1, 566, 575.1, 90.1–90.3, 455/422.1, 403, 426.1, 426.2; 379/428.1, 379/428, 3, 433.01, 433.04, 445; 345/173; 715/702, 863, 864

See application file for complete search history.

(56) References Cited

U.S. PATENT DOCUMENTS 7,480,870 B2    1/2009    Anzures et al.
7,657,849 B2 *  2/2010    Chaudhri et al. ............. 715/863
(Continued)

FOREIGN PATENT DOCUMENTS

JP    2002-182892 A    6/2002
JP    2007-086977 A    4/2007
(Continued)

OTHER PUBLICATIONS

Office Action dated May 16, 2014 issued for Japanese patent application No. 2010-214693.
(Continued)

*Primary Examiner* — Keith Ferguson
(74) *Attorney, Agent, or Firm* — Procopio, Cory, Hargreaves and Savitch, LLP

(57) ABSTRACT

[Structure] A mobile phone (10) includes a touch panel (38) and a touch control circuit (36) detecting a touch operation, and can set a lock state that a telephone function or the like is restricted. If the lock state is set and a key operation is performed, a message urging to long-depress a touch is displayed on a display (30), and when the touch is detected, a changing object representing an elapse of time is displayed on the display (30). If five (5) seconds elapse in a touched state, a completion image is displayed on the display (30). Then, if a finger is released from the touch panel (38) within three (3) seconds after the completion image is displayed, the lock state is canceled.

3 Claims, 12 Drawing Sheets

(51) Int. Cl.
*H04M 1/67* (2006.01)
*H04M 1/677* (2006.01)
*G06F 3/0488* (2013.01)
*G06F 21/36* (2013.01)
*H04M 1/725* (2006.01)

(52) U.S. Cl.
CPC ............... *H04M 1/67* (2013.01); *H04M 1/677* (2013.01); *H04M 1/72544* (2013.01); *H04M 1/72577* (2013.01); *H04M 2250/22* (2013.01)

(56) References Cited

U.S. PATENT DOCUMENTS

2005/0253817 A1* 11/2005 Rytivaara et al. ............ 345/173
2007/0150842 A1 6/2007 Chaudhri et al.
2010/0020035 A1 1/2010 Ryu et al.
2010/0146384 A1 6/2010 Peev et al.
2010/0269040 A1* 10/2010 Lee ............................... 715/702

FOREIGN PATENT DOCUMENTS

JP 2010-146506 A 7/2010
WO 2007/076210 A1 5/2007

OTHER PUBLICATIONS

International Search Report dated Nov. 1, 2011, issued for International Application No. PCT/JP2011/068739.

* cited by examiner

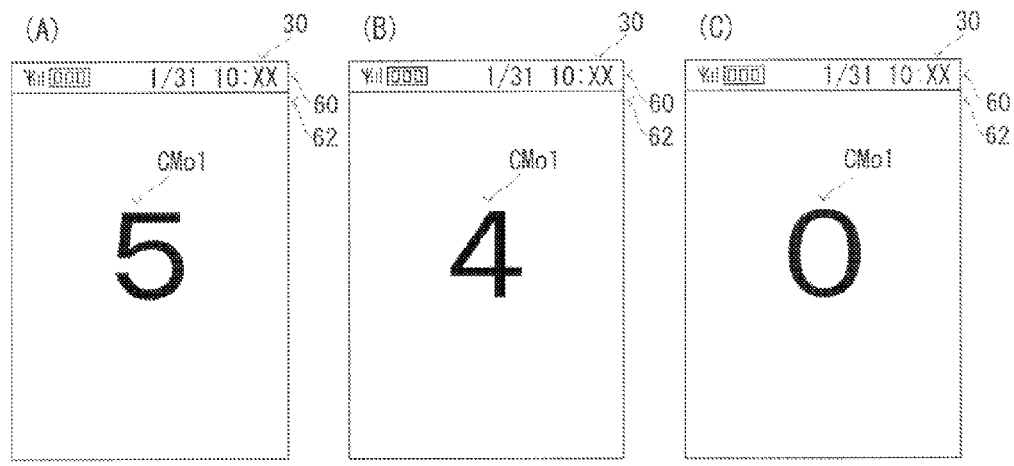
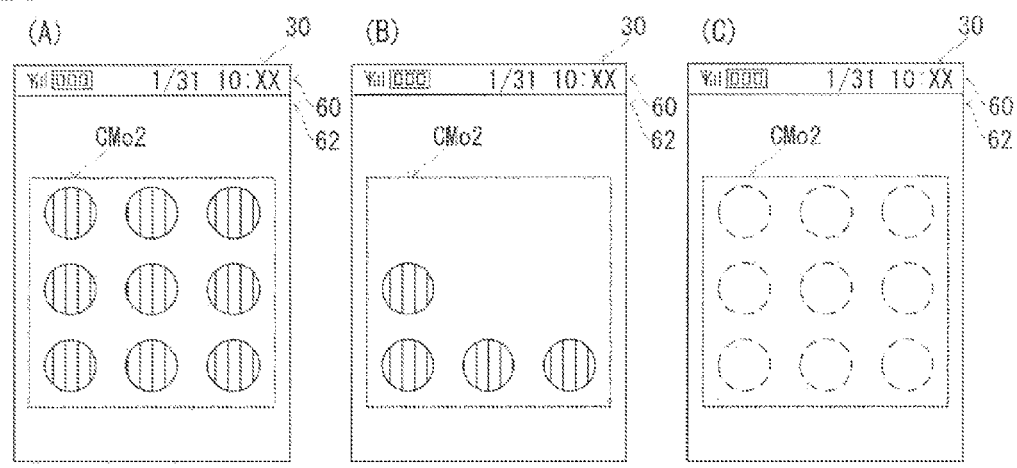
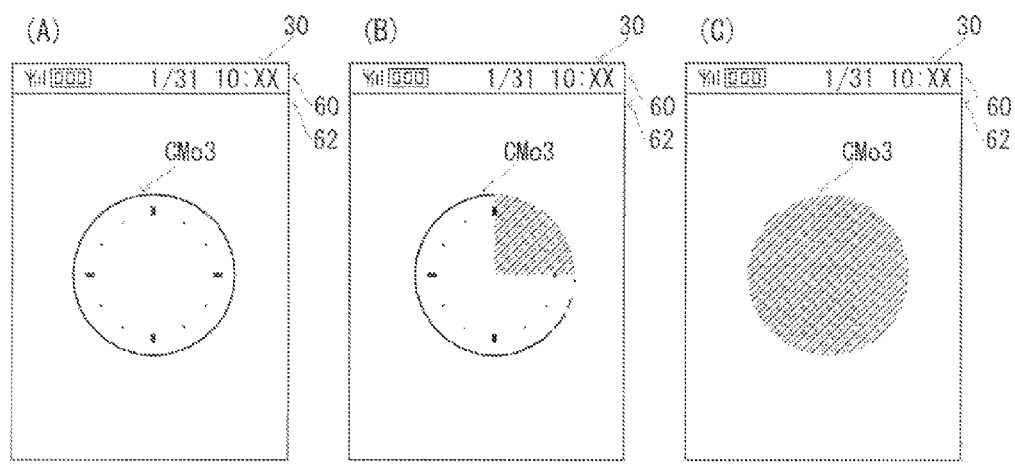

FIG. 11
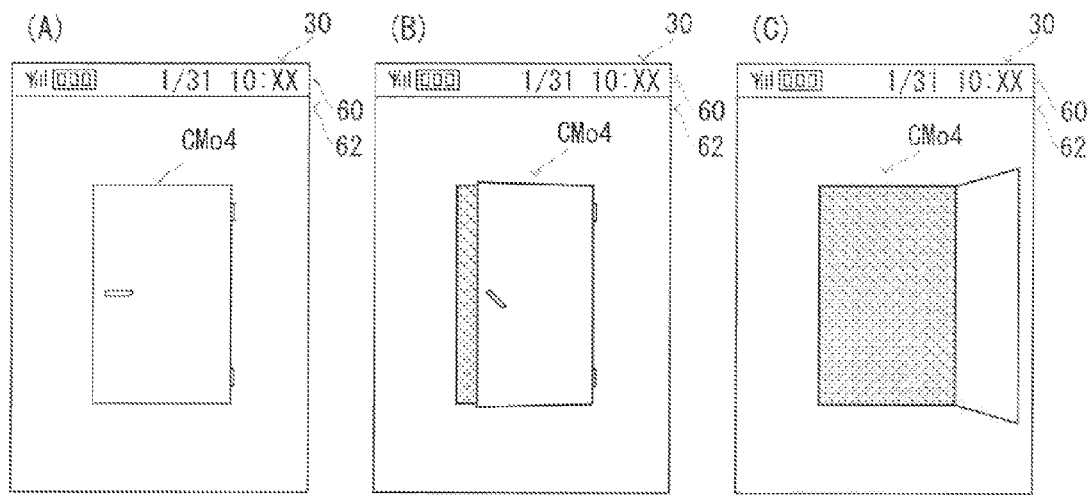
FIG. 12
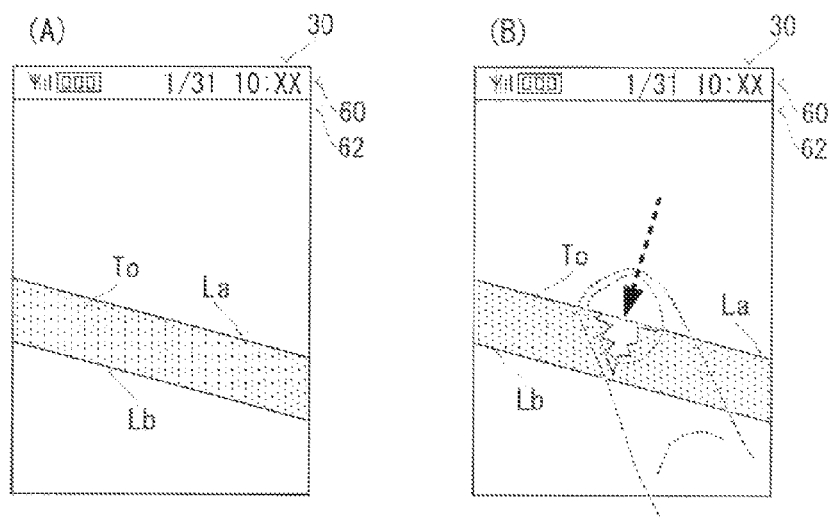
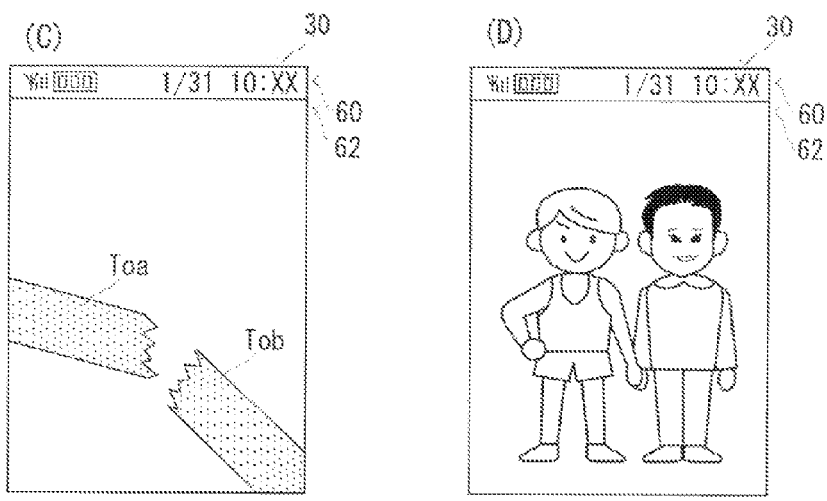

PORTABLE TERMINAL AND LOCK STATE CANCELING METHOD

FIELD OF ART

The present invention relates to a portable terminal and a lock state canceling method, and more specifically, a portable terminal capable of setting a lock state and a lock state canceling method.

SUMMARY OF THE INVENTION

A first invention is a portable terminal having a touch panel and a touch operation detecting portion which detects a touch operation and capable of setting a lock state where predetermined processing based on a touch detected by the touch operation detecting portion is not performed, comprising: a displaying portion which performs displaying of an object for canceling the lock state when the lock state is set; a determining portion which determines whether or not a touch operation by which the object is changed to predetermined displaying is performed with respect to the object; and a canceling portion which cancels the lock state when it is determined by the determining portion that the touch operation by which the object is changed to the predetermined displaying is performed.

In the first invention, a portable terminal (10: reference numeral exemplifying a portion corresponding to the embodiment, and so forth) includes a touch panel (38) provided on a display (30) and a touch operation detecting portion (36) which detects a touch. Furthermore, in the portable terminal, it is possible to set a lock state where a function such as a telephone function based on a detected touch is not performed or the touch operation detecting portion is restricted from receiving a touch.

A displaying portion (24, S21, S25, S27, S51) performs displaying an object for canceling the lock state when the lock state is being set. A determining portion (24, S33, S57, S67) determines whether or not a touch operation by which the object is changed to predetermined displaying is performed with respect to the object. A canceling portion (24, S39, S73) cancels the lock state when it is determined by the determining portion that the touch operation by which the object is changed to the predetermined displaying is performed.

According to the first invention, an operability when canceling the lock state is improved.

BRIEF DESCRIPTION OF THE DRAWINGS

FIG. 8 is a view showing still another example of procedure for canceling a lock state set in the mobile phone shown in FIG. 1.

FIG. 9 is a view showing yet another example of procedure for canceling a lock state set in the mobile phone shown in FIG. 1.

FIG. 10 is a view showing a further example of procedure for canceling a lock state set in the mobile phone shown in FIG. 1.

FIG. 11 is a view showing a still further example of procedure for canceling a lock state set in the mobile phone shown in FIG. 1.

FIG. 12 is a view showing an yet further example of procedure for canceling a lock state set in the mobile phone shown in FIG. 1.

FORMS FOR EMBODYING THE INVENTION

First Embodiment

Figure 1:
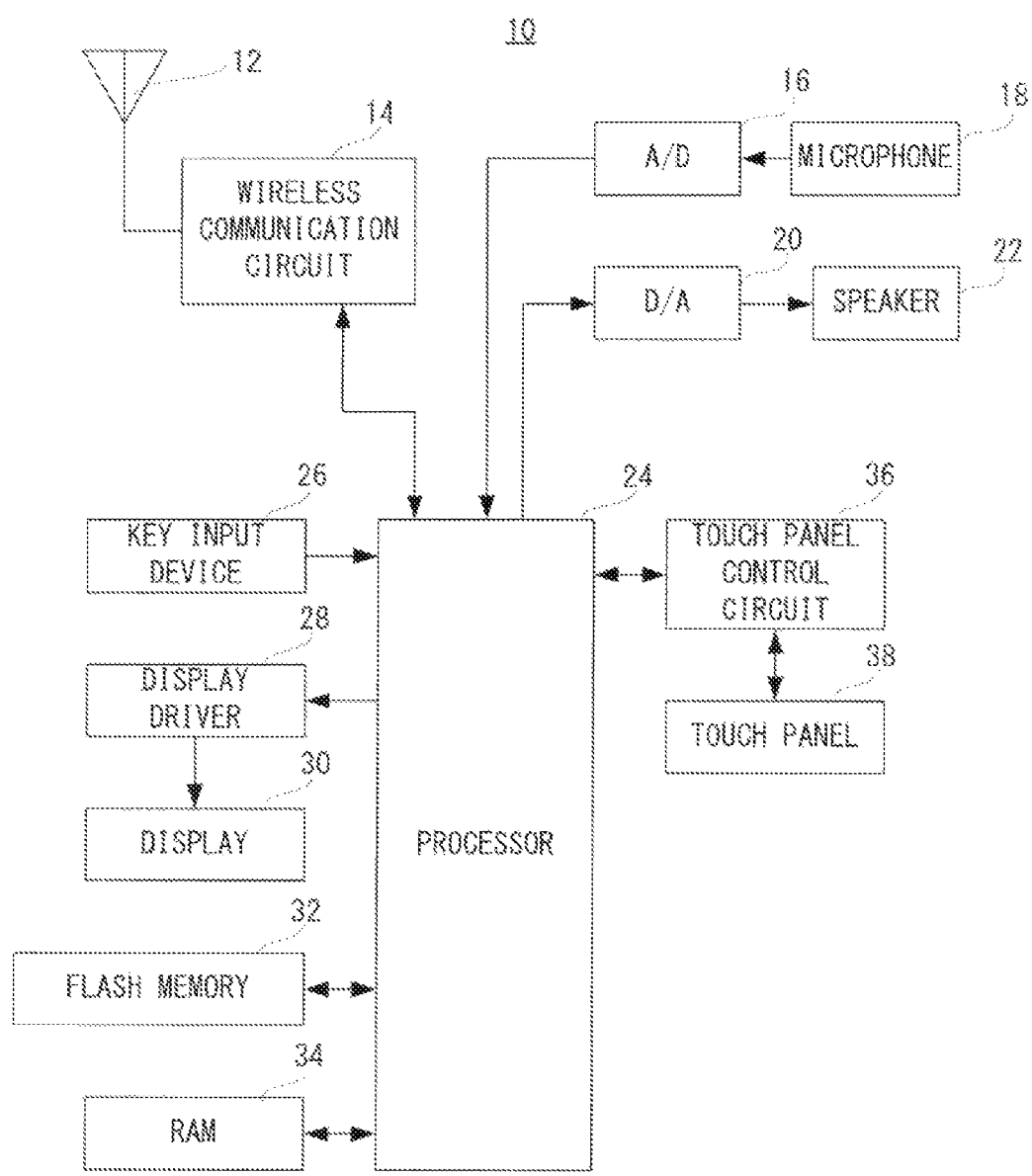
FIG. 1 is a view showing electrical structure of a mobile phone of an embodiment according to the present invention.

With referring to FIG. 1, a mobile phone 10 is a kind of a mobile communication terminal, and includes a processor 24 called as a computer or a CPU. The processor 24 is connected with a wireless communication circuit 14, an A/D converter 16, a D/A converter 20, a key input device 26, a display driver 28, a flash memory 32, a RAM 34 and a touch panel control circuit 36. Furthermore, an antenna 12 is connected to the wireless communication circuit 14. The A/D converter 16 is connected with a microphone 18 and the D/A converter 20 is connected with a speaker 22. A display 30 is connected to the display driver 28. A touch panel 38 is connected to the touch panel control circuit 36.

The processor 24 is an IC for controlling and in charge of a whole control of the mobile phone 10. The RAM 34 is used as a working area (including an image drawing area) and a buffer area for the processor 24. Data of a content such as characters, images or videos, sounds, voices, etc. of the mobile phone 10 is recorded in the flash memory 32.

The A/D converter 16 converts an analog sound signal of the sound or voice input through the microphone 18 into a digital sound signal. The D/A converter 20 converts (decodes) a digital sound signal into an analog sound signal to apply to the speaker 22 via an amplifier not shown. Therefore, a sound or voice corresponding to the analog sound signal is output from the speaker 22.

Figure 2:
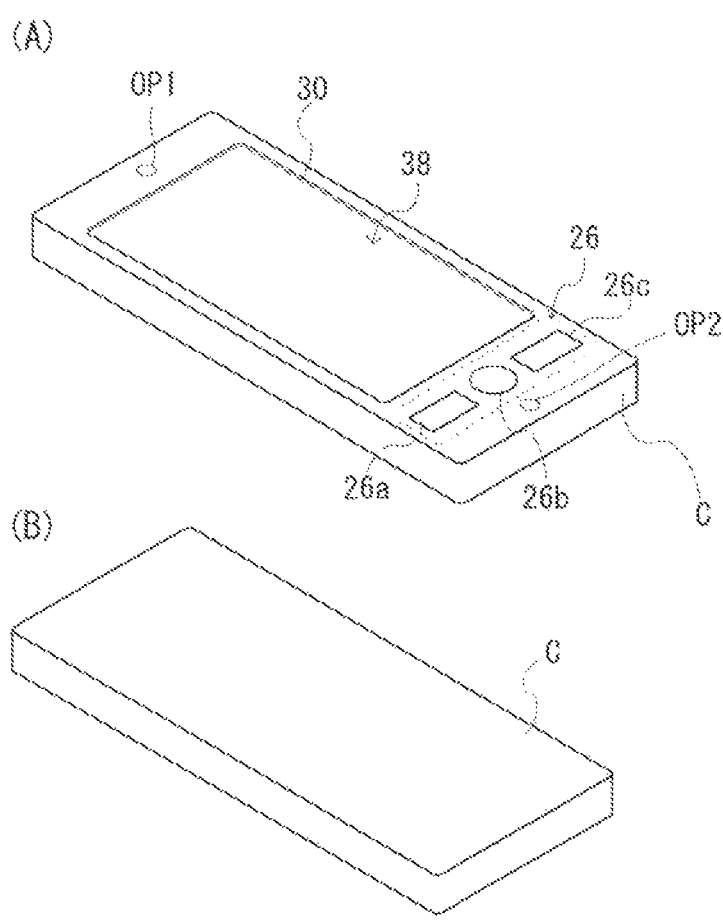
FIG. 2 is a view showing an appearance of the mobile phone shown in FIG. 1.

The key input device 26 includes a call key 26*a*, a menu key 26*b*(operating portion) and an end key 26*c* as shown in FIG. 2(A). Information (key data) of the key operated by the user is input to the processor 24. In addition, if a key included in the key input device 26 is operated, a click sounds, and then, it is possible for a user to obtain an operational feeling to a key operation by hearing the click.

The display driver 28 controls the displaying of the display 30 connected to this display driver 28 under instructions by the processor 24. In addition, the display driver 28 includes a VRAM which temporarily stores image data to be displayed. Then, the processor 24 stores the image data to be displayed on the display 30 in this VRAM.

The touch panel 38 detects that one or more fingers is brought into contact with the touch panel 38 by an electrostatic capacitance system which detects a change of an electrostatic capacitance between electros, which occurs when an object such as a finger is in close to a surface of the touch panel, for example. In addition, the touch panel 38 is a pointing device which is provided on the display 30 and designates an arbitrary position within a screen of the display. The touch panel 38 detects an operation if an upper surface thereof is operated by pushing, stroking, contacting by a finger(s). When the finger is brought into contact with the touch panel 38, the touch panel control circuit 36 which functions as a detecting portion specifies a position of the finger and outputs coordinates data indicative of he operated position to the processor 24. That is, the user can input an operating direction, an image, etc. to the mobile phone 10 by pushing, stroking or contacting to the surface of the touch panel 38 with his/her finger.

Here, an operation that a user touches with his/her finger an upper surface of the touch panel 38 is called as "touch". An operation releasing the finger from the touch panel 38 is called as "touch release" or "release". Furthermore, coordinates pointed by the touch is called as "a touch point (touch start position, a first position)", coordinates pointed by the release is called as "a release point (touch end position, a second position)". An operation stroking the surface of the touch panel 38 is called as "slide", "slide touch operation" or "moving operation with a contact member being brought into contact". An operation that the user touches the surface of the touch panel 38 and then releases the touch is called as "touch and release". Then, an operation performed against the touch panel 38 such as touch, release, slide and touch and release, etc. is called as collectively "touch operation (contact)".

In addition, a touch operation is not limited to an operation by a finger, may be performed by a touch pen that an electric conductor is attached at a tip end thereof or the like. Furthermore, for a detection system of the touch panel 38, a surface-type electrostatic capacitance system may be adopted, or a resistance film system, an ultrasonic system, an infrared ray system, an electromagnetic induction system or the like may be adopted.

The wireless communication circuit 14 is a circuit for performing a wireless communication with a CDMA system. For example, if the user designates a telephone call using a key input device 26, the wireless communication circuit 14 performs the telephone call processing under instructions from the processor 24 and outputs a telephone call signal via the antenna 12. The telephone call signal is transmitted to a telephone at the other end of the line through a base station and a communication network (not shown). Then, the incoming processing is performed in the telephone at the other end of the line, a communication-capable state is established and the processor 24 starts the telephonic communication processing.

Describing specifically, the normal telephonic communication processing, a modulated sound signal sent from a telephone at the other end of the line is received by the antenna 12. The modulated sound signal received is subjected to the demodulation processing and the decode processing by the wireless communication circuit 14. A received sound signal obtained through such processing is converted into an analog sound signal by the D/A converter 20 to be output from the speaker 22. On the other hand, a sending sound signal taken-in through the microphone 18 is converted into a digital sound signal by the A/D converter 18 to be applied to the processor 24. The sending sound signal which is converted into the digital sound signal is subjected to the encode processing and the modulation processing by the wireless communication circuit 14 under instructions by the processor 24 to be output via the antenna 12. Therefore, the modulated sound signal is transmitted to the telephone at the other end of the line via the base station and the communication network.

When the telephone call signal from a telephone at the other end of the line is received by the antenna 12, the wireless communication circuit 14 notifies the processor 24 of the incoming call. In response thereto, the processor 24 displays on the display 30 sender information (telephone number and so on) described in the incoming call notification by controlling the display driver 28. In addition, at the approximately same time, the processor 24 outputs from the speaker a ringtone (may be also called as a ringtone melody, a ringtone voice). Furthermore, the processor 24 cause the mobile phone 10 to vibrate or the LED to emit light in order to notify the incoming call Then, if the user performs a responding operation by using the call key 26a, the wireless communication circuit 14 performs the incoming call processing under instructions by the processor 24, whereby the communication-capable state is established, the processor 24 performs the above-described normal telephone conversation processing.

If the telephone communication ending operation is performed by the end key after a state is changed to the communication-capable state, the processor 24 transmits the telephone communication ending signal to the telephone at the other end of the line by controlling the wireless communication circuit 14. Then, after the transmission of the telephone communication ending signal, the processor 24 terminates the telephone communication processing. Furthermore, in a case that the telephone ending signal from the telephone at the other end of the line is previously received, the processor 24 also terminates the telephone communication processing. In addition, in a case that the telephone communication ending signal is received from the mobile communication network not from the telephone at the other end of the line, the processor 24 also terminates the telephone communication processing.

FIG. 2(A) is an appearance view showing an appearance of a top surface of the mobile phone 10, and FIG. 2(B) is an appearance view showing an appearance of a rear surface of the mobile phone 10. With referring to FIG. 2(A), the mobile phone 10 has a shape of straight-type and a housing C of a rectangular in plane. The microphone 18 is housed within the housing C, and an opening OP2 communicated with the housed microphone 18 is provided on the surface at one end a longitudinal direction of the housing C. A speaker 22 is also housed within the housing C, and an opening OP1 communicated with the housed speaker 22 is provided on the surface at the other end in the longitudinal direction of the housing C. The display 30 is mounted in such a manner that a monitor screen can be seen from a top surface side. Then, a touch panel 38 is provided on the display 30.

Various kinds of keys included in the key input device 26 includes the call key 26a, the menu key 26b and the end key 26c, and these keys are provided on the top surface of the housing C.

For example, the user inputs a telephone number by performing a touch operation onto the dial key displayed on the display 30, and by the call key 26a, performs a voice transmission operation. Then, if the telephone conversation is ended, the user performs the ending operation by the end key 26b. The user performs a selection and decision of the menu by performing touch operations onto a soft key and a menu both displayed on the display 30. Then, by long-depressing the end key 26b, the user turns-on/-off a power of the mobile phone 10.

In addition, in FIGS. 2(A) and 2(B), the antenna 12, the wireless communication circuit 14, the A/D converter 16, the D/A converter 20, the processor 24, the display driver 28, the flash memory 32, the RAM 34, the touch panel control circuit 36, the camera module, the I/F 46 and the memory card 48 are housed within the housing C, and therefore, not shown in FIG. 2(A) and FIG. 2(B).

Here, the mobile phone 10 has a lock function that an available function in the mobile phone 10 such as a telephone function, etc. are restricted or that the touch operation detecting portion is made not to receive the touch. If the end key 26c is operated, for example, a power for the display 30 is turned-off and the lock state is set, whereby a touch operation for performing the telephone function becomes invalid. In a case that the lock state is set, since the power for the touch panel 38 is also turned-off, it is impossible to receive the touch operation; however, if the power for the display 30 is turned-on in a state that the lock state is being set, the power for the touch panel 38 is also turned-on simultaneously, the touch operation becomes to be detected. Then, when a touch operation described in a next paragraph and thereafter is performed, the lock state is canceled. In the following, with referring to FIG. 3(A)-FIG. 3(E), procedure for canceling the lock state will be described.

Figure 3:
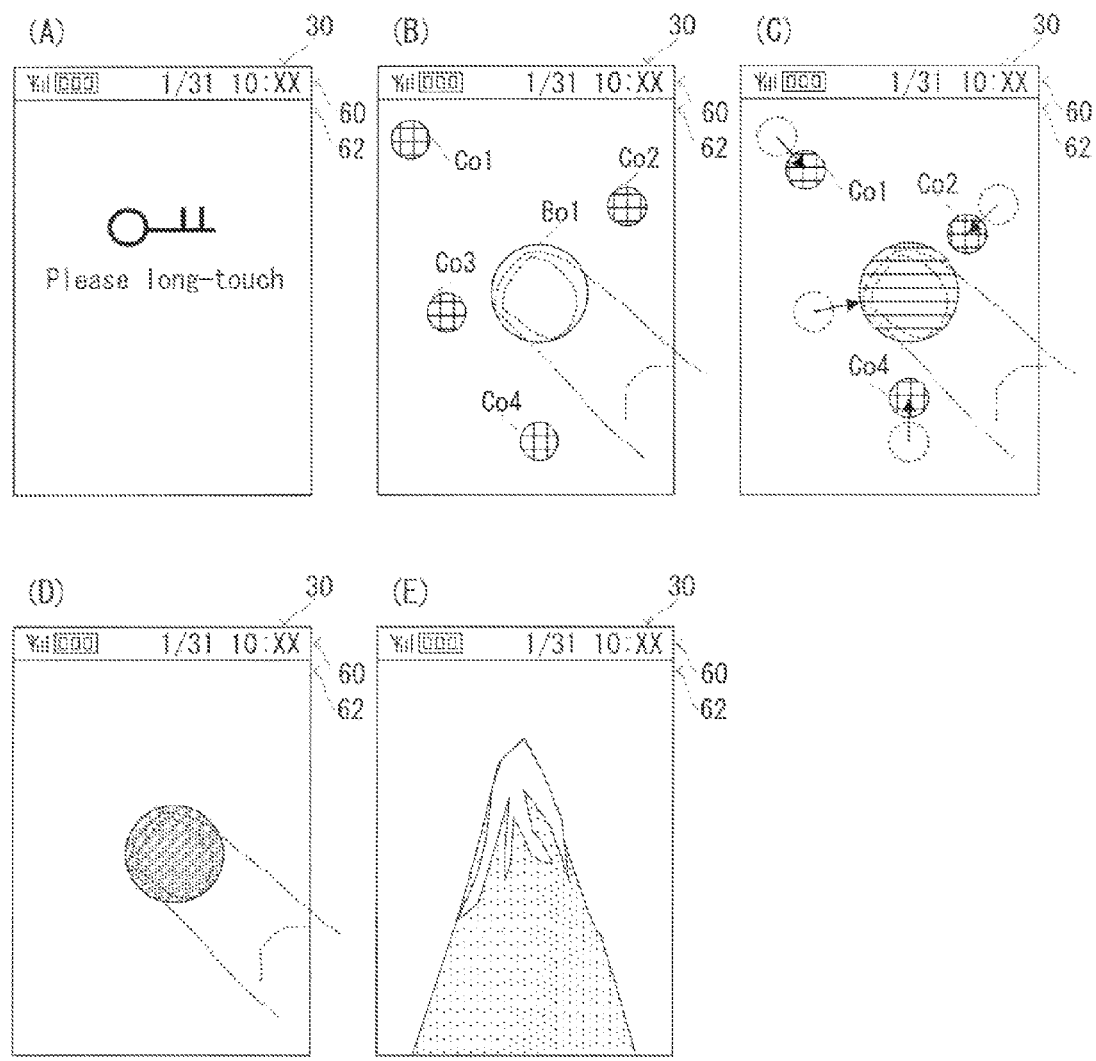
FIG. 3 is a view showing one example of procedure for canceling a lock state set in the mobile phone shown in FIG. 1.

First, with referring to FIG. 3(A), if the menu key 26b is operated in a state that the lock state is being set, the power for the display 30 is turned-on, and a lock screen is displayed. A displaying area of the display 30 is constituted by a status displaying area 60 and a function displaying area 62. In the status displaying area 60, an icon (also called as "picto") representative of a radio-wave reception state by the antenna 12, an icon representative of a residual battery capacity of the secondary battery and current date and time are displayed. In the function displaying area 62, as the lock screen, a message ("Please long-touch", for example) urging a long-depression by touch is displayed. In addition, the current time displayed in the state displaying area 60 is based on time information output by an RTC (Real Time Clock).

Next, with referring to FIG. 3(B), if the touch panel 38 is touched, in the function displaying area 62, a first base object Bo1 of a white color and count objects Co1-Co4 of an yellow color (in a case not to be distinguished, simply called as "count object Co") are displayed. The first base object Bo1 is represented by a circle with the center being the touch point, and each count object Co is represented by a circle smaller than that of the first base object Bo1. Respective count objects Co are arranged with the centers being random positions in the function displaying area 62.

With referring to FIG. 3(C), if the touch is maintained, each count object Co is moved toward the first base object Bo1. When the count object Co is brought into contact with the first base object Bo1, the count object Co is made non-displayed. In a state shown in FIG. 3(C), for example, the count object Co3 is non-displayed because the same is brought into contact with the first base object Bo1. Then, when the count objects Co all disappear, a color of the first base object Bo1 is changed to a light yellow color.

However, in a case that the release is performed, that is, the touch is released from the touch panel 38 before all count objects Co disappear, the displaying of the display 30 returns to a state of FIG. 3(A).

Here, a method for determining a contact of the object will be described. A distance between the two objects can be evaluated by the center position of the first base object Bo1 and the center position of the count object Co. In a case that a circumference of the first base object Bo1 and a circumference of the count object Co are brought into contact with each other, the distance between the two objects becomes a value obtained by adding a radius of the count object Co to a radius of the first base object Bo1. Therefore, in this embodiment, if the distance between the two objects becomes equal to or less than a distance obtained by adding the radii of the two objects to each other, it is determined that the two objects are brought into contact with each other. In addition, for determining the contact between the two objects, other algorithm may be utilized.

A moving speed of each count object Co is determined based on a first predetermined time period (5 seconds, for example) that is set for the lock canceling and a distance between the first base object Bo1 and the count object Co furthest from the first base object Bo1. In FIG. 3(B), for example, the count object Co furthest from the first base object Bo1 is the count object Co1. Therefore, based on the distance between the first base object Bo1 and the count object Co1 and the first predetermined time period, a moving distance at every one (1) second (or one (1) frame), that is the moving speed is determined for all the count objects Co1-Co4. Therefore, before the furthest count object Co1 disappears, the count objects Co2-Co4 disappear previously. Then, since a time is represented by a process that the count object Co moves, it becomes possible for the user to visibly grasp a process of time.

With referring to FIG. 3(D), the color of the first base object Bo1 becomes higher in a density at every time that the count object Co is brought into contact with the first base object Bo1, and when all the count objects Co disappear, the color of the first base object Bo1 becomes to have a highest density. That is, if a time period set in advance elapses while the touch panel 38 is being touched, as a completion image, the first base object Bo1 in a deep yellow color is displayed on the display 30.

Then, with referring to FIG. 3(E), if the release is performed within a second predetermined time period (three (3) seconds, for example) in a state that the color density of the first base object Bo1 is the highest, the first base object Bo1 is non-displayed, whereby the lock state of the mobile phone 10 can be canceled. For example, the displaying of the display 30 becomes to a state shown in FIG. 3(D) if five (5) seconds elapses while the touch to the touch panel 38 is maintained in a state of FIG. 3(A). Then, if the user releases the touch from the touch panel 38 within three (3) seconds, the lock state is canceled, and therefore, the displaying of the display 30 becomes to a state shown in FIG. 3(E).

Accordingly, even if the touch to the touch panel 38 is detected in a state that the mobile phone 10 is put in a bag, as far as the touch is not maintained for the first predetermined time period, the lock state is never canceled. That is, it is possible to make the lock state not be canceled due to an erroneous detection of the touch. In addition, by further providing a restriction time period (a second predetermined time period) for the procedure to cancel the lock state, it is possible to make possibility that the lock state is erroneously canceled lower.

In addition, the touch operation to the touch panel 38 is made invalid until the lock screen shown in FIG. 3(A) is displayed. Therefore, until the lock screen is displayed, it is possible to turn-off the power for the display 30, whereby a power consumption in the mobile phone 10 can be suppressed.

Furthermore, in this embodiment, by turning-off the power for the touch panel control circuit 36 and the touch panel 38, the touch is made invalid, and therefore, the power consumption of the mobile phone 10 can be further suppressed. However, in other embodiments, the touch may be made invalid by which performs the processing by which the processor 24 ignores the input touch coordinates while the power for the touch panel control circuit 36 and touch panel 38 is not turned-off.

Figure 4:
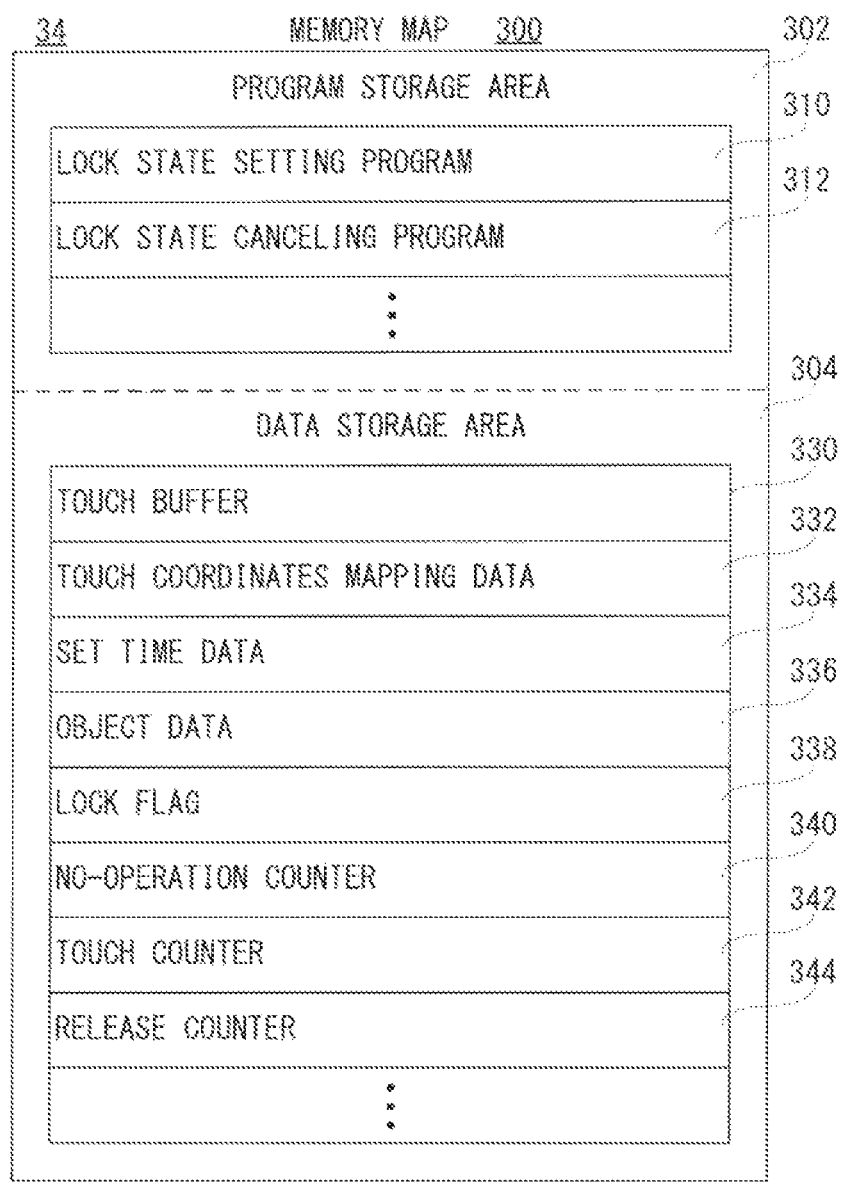
FIG. 4 is a view showing one example of a memory map of a RAM shown in FIG. 1.

FIG. 4 is a view showing a memory map 300 of the RAM 34. In the memory map 300 of the RAM 34, a program storage area 302 and a data storage area 304 are included. The program and data are read wholly once or partially and sequentially according to necessity from the flash memory 32 to be stored in the RAM 34, and then, processed by the processor 24.

The program storage area 302 is stored with programs for operating the mobile phone 10. The programs for operating the mobile phone 10 includes, for example, a lock state setting program 310, a lock state canceling program 312, etc. The lock state setting program 310 is a program for setting a lock state in the mobile phone 10. The lock state canceling program 312 is a program for canceling the lock state set in the mobile phone 10.

In addition, although not shown, the programs for operating the mobile phone 10 include a program for notifying a user of an incoming call state, a program for establishing a telephone conversation state, etc.

The data storage area 304 is provided with a touch buffer 330, etc., and stored with touch coordinates map data 332, set time data 334, object data 336, etc. The data storage area 304 is further provided with a lock flag 338, a no-operation counter 340, a touch counter 342, a release counter 344, etc.

The touch buffer 330 is temporarily stored with touch coordinates data output from the touch panel control circuit 36, including a touch point, a release point, and a current touch position.

The touch coordinates map data 332 is data for mapping touch coordinates of the touch operation and displaying coordinates of the display 30 with each other. That is, the processor 24 makes a result of the touch operation performed to the touch panel 38 correspond to displaying of the display 30 based on the touch coordinates map data 332.

The set time data 334 is data including the first predetermined time period and the second predetermined time period utilized for canceling the lock state. If the first predetermined time period is five (5) seconds and the second predetermined time period is three (3) seconds, for example, data including 5 seconds and 3 seconds constitutes the set time data 334. The object data 336 is image data of the first base object Bo1 and count objects Co displayed on the display 30.

The lock flag 338 is a flag for determining whether or not the lock state is set. The lock flag 338 is constructed by a 1-bit register, for example. If the lock flag 338 is turned-on (true), a data value "1" is set in the register, and if the lock flag 338 is turned-off (failure), a data value "0" is set in the register.

The no-operation counter 340 is a counter for measuring a predetermined time period (60 seconds, for example) and starts a count upon the initialization. In addition, the no-operation counter 340 is also called as a no-operation timer, and if the no-operation timer is executed, the no-operation counter 340 is initialized and starts a count. The no-operation timer is initialized at every timing that the key operation or the touch operation is performed.

The touch counter 342 is a counter for measuring the first predetermined time period and starts a count upon the initialization. The touch counter 342 is also called as a touch timer, and initialized when the touch is performed in a state that the displaying shown in FIG. 3(A) is made. The release counter 342 is a counter for measuring the second predetermined time period, and as similar to other counters, starts a count upon initialization. The release counter 344 is also called as a release timer, and initialized upon the expiration of the touch timer.

Although not shown, the data storage area 304 is further provided with a buffer for temporarily storing data that the RTC outputs, and stored with the image data for displaying a GUI, and further provided with counters and flags necessary for operation of the mobile phone 10.

Figure 5:
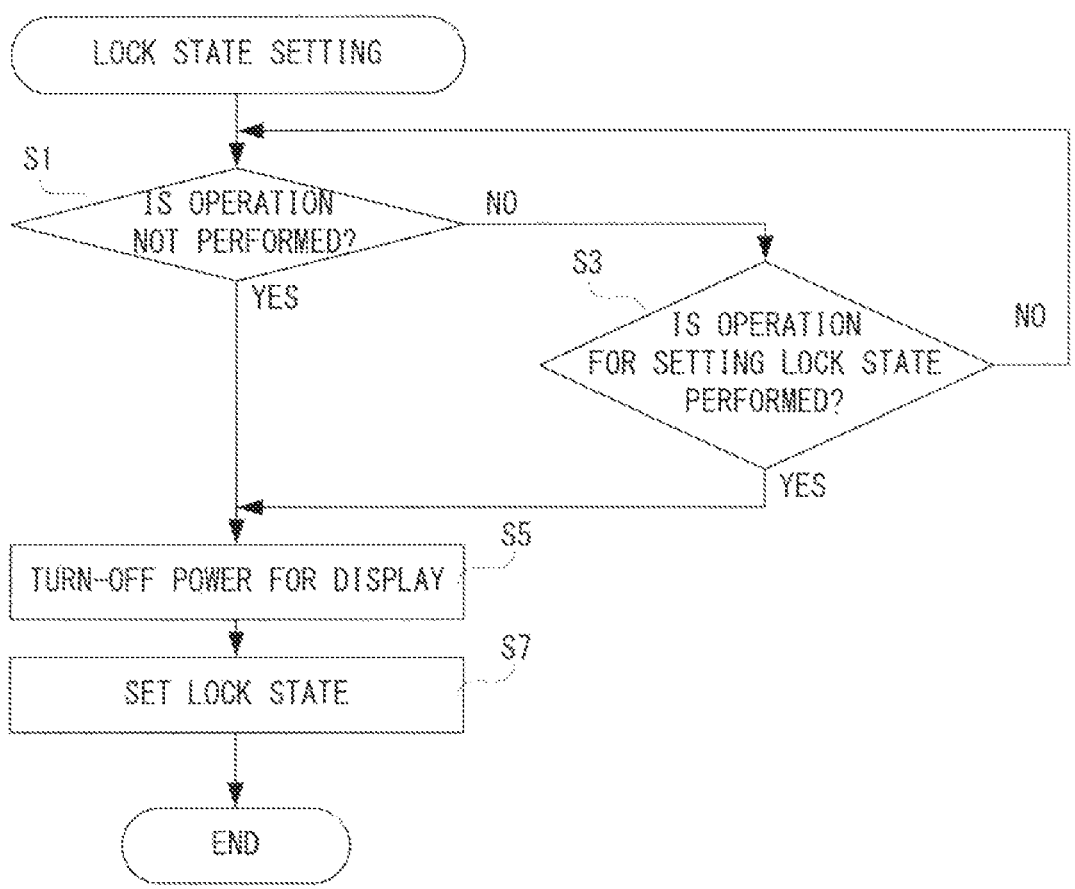
FIG. 5 is a flowchart showing a lock state setting process by a processor shown in FIG. 1.
Figure 6:
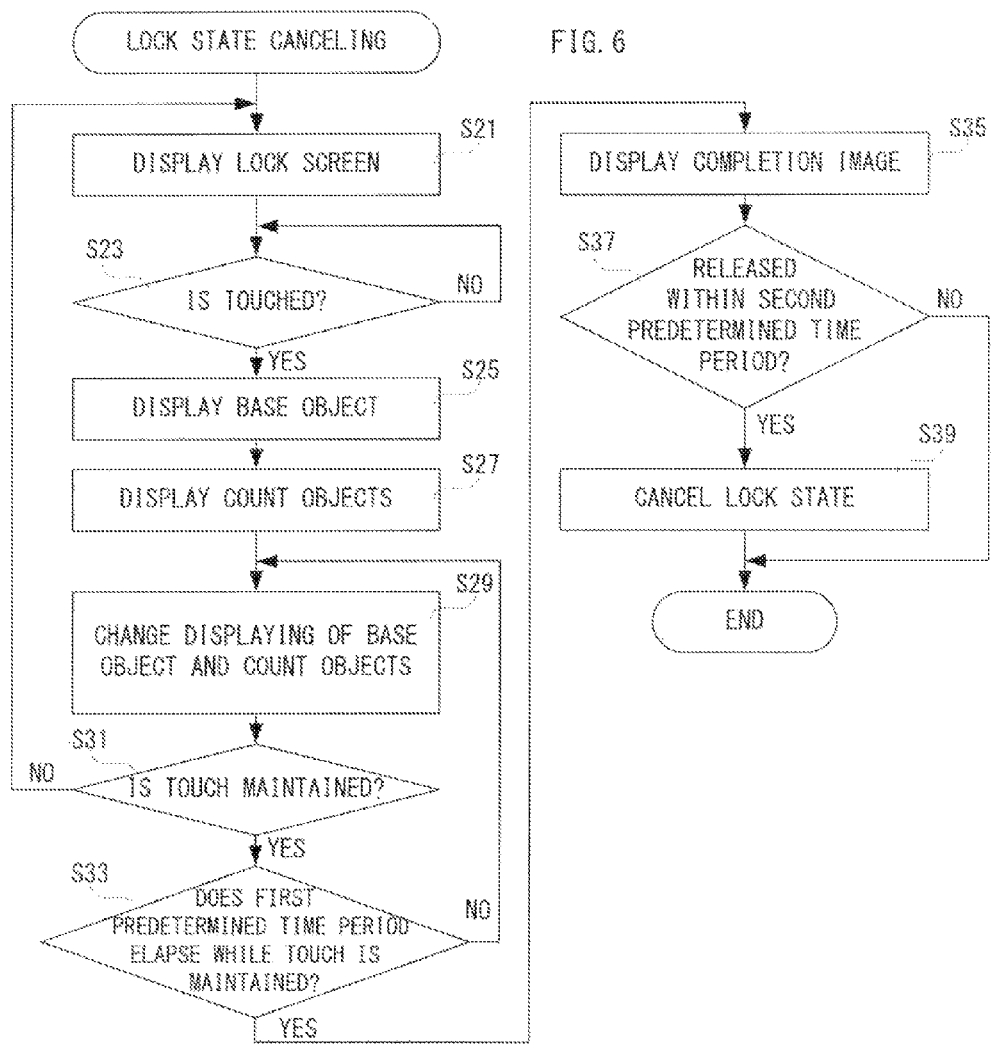
FIG. 6 is a flowchart showing a lock state canceling process by the processor shown in FIG. 1.

The processor 24 processes a plurality of tasks including a lock state setting process shown in FIG. 5 and a lock canceling process shown in FIG. 6, etc., in parallel with each other under controls of Linux (registered trademark)-base OS such as Android (registered trademark) and REX, or other OSs.

FIG. 5 is a flowchart of a lock state setting process. If a power of the mobile phone 10 is turned-on, for example, in a step S1, the processor 24 determines whether or not an operation is not performed. That is, the processor 24 determines whether or not the no-operation timer expires if the touch operation or the key operation is not performed for the predetermined time period (60 seconds, for example). If "YES" is determined in the step S1, that is, if the touch operation or the key operation is not performed for the predetermined time period, the process by the processor 24 proceeds to a step S5. If "NO" is determined in the step S1, that is, if the no-operation timer does not expire, the processor 24 determines whether or not an operation for setting the lock state is performed in a step S3. For example, the processor 24 determines whether or not the end key 26c is operated. If "NO" is determined in the step S3, that is, if the operation for setting the lock state is not performed, the process by the processor 24 returns to the step S1.

If "YES" is determined in the step S3, that is, if the operation for setting the lock state is performed, the processor 24 turns-off a power for the display 30 in the step S5. That is, the processor 24 outputs an instruction for turning-off the power for the display 30 to a power circuit. Subsequently, the processor 24 sets a lock state in the step S7, and terminates the lock state setting process. That is, the processor 24 sets the lock flag 338 off in the step S7.

In addition, in other embodiments, the power for the display 30 may be turned-off after the lock state is set. In such a case, an order of the step S5 is replaced with the step S7 in the lock state setting process in FIG. 5. That is, in the other embodiments, the processing in the step S5 is performed after the processing of the step S7 is performed.

FIG. 6 is a flowchart of a lock state canceling process. If the menu key 26b, for example is operated at a time that the lock state is being set, the processor 24 displays a lock screen in a step S21. That is, the processor 24 displays the lock screen shown in FIG. 3(A) on the display 30 after the processor 24 outputs an instruction for turning-on the power for the display 30. In addition, the processor 24 which performs the processing in the step S21 functions as a displaying portion or a message displaying portion.

Subsequently, the processor 24 determines whether or not the touch is performed in a step S23. That is, it is determined whether or not the touch is detected by the touch panel control circuit 36. If "NO" is determined in the step S23, that is, if the touch is not detected, the processor 24 repeatedly executes the step S23.

If "YES" is determined in the step S23, that is, if the touch is detected, the processor 24 displays the first base object Bo1 in a step S25. That is, the processor 24 reads the coordinates data of the touch point from the touch buffer 330, and displays the first base object Bo1 included in the object data 336 with a center being the coordinates of the touch point. Next, the processor 24 displays the count objects Co in a step S27. That is, the processor 24 randomly determines coordinates in the displaying coordinates of the display 30 out of a range that the first base object Bo1 is being displayed, and displays the count objects Co included in the object data 336 with centers being randomly determined coordinates. Then, if the steps S25 and S27 are executed, as shown in FIG. 3(B), the first base object Bo1 and the count objects Co are displayed on the display 30. In addition, the processor 24 which performs the processing in the steps S25 and S27 functions as a displaying portion or a time displaying portion.

Subsequently, the processor 24 changes the displaying of the first base object Bo1 and the count objects Co in a step S29. That is, the processor 24 determines a movement direction for each count object Co based on the center positions of the first base object Bo1 and the concerned count object Co. Furthermore, the processor 24 calculates a speed (a moving distance for each predetermined time period) based on the count object Co furthest from the first base object Bo1 and the first predetermined time period constituting the set time data 334. Then, the processor 24 moves positions of the respective count objects Co by determined distances in determined directions. In addition, the processor 24 non-displays the displaying of the count object Co when the count object Co is brought into contact with the first base object Bo1.

Next, the processor 24 determines whether or not the touch is maintained in a step S31. That is, the processor 24 determines whether or not the release is detected by the touch panel control circuit 36. If "NO" is determined in the step S31, that is, if the touch is released, for example, the process by the processor 24 returns to the step S21. Then, the displaying of the display 30 returns to the state of FIG. 3(A). If "YES" is determined in the step S31, that is, if the finger of the user still touches the touch panel 38, for example, the processor 24 determines whether or not the first predetermined time period elapses while the touch is maintained in a step S33. That is, the processor 24 determines whether or not the touch timer expires. In addition, the processor 24 which performs the processing of the step S33 functions as a determining portion or a first determining portion.

If "NO" is determined in the step S33, that is, if the first predetermined time period does not elapse after the touch panel 38 is touched, the process by the processor 24 returns to the step S29. Then, the processor 24 repeatedly executes the processing of the step S29 as far as the touch is not released within the first predetermined time period, and therefore, the displaying positions of the count objects Co are changed like an animation.

If "YES" is determined in the step S33, that is, if the first predetermined time period elapses while the touch is maintained, the processor 24 displays a completion image in a step S35. For example, the processor 24 displays the first base object Bo1 of the highest color density on the display 30 as shown in FIG. 3(D). The processor 24 executes the processing in the step S35, and initializes the release timer to start measurement of the second predetermined time period. In addition, the processor 24 which performs the processing of the step S35 functions as a completion image displaying portion.

Subsequently, in a step S37, the processor 24 determines whether or not the release is performed within the second predetermined time period. That is, the processor 24 determines whether or not the touch becomes not to be detected by the touch panel control circuit 36 before the release timer expires. If "YES" is determined in the step S37, that is, if the touch is released within the second predetermined time period in a state that the image shown in FIG. 3(A) is being displayed, for example, the processor 24 cancels the lock state in a step S39, and terminates the lock state canceling process. That is, the lock flag 338 is set as off. In addition, the processor 24 which performs the processing of the step S39 functions as a canceling portion or a first canceling portion. On the other hand, If "NO" is determined in the step S37, that is, if the release timer expires before the touch is released from the touch panel 38, the processor 24 terminates the lock state canceling process. That is, the processor 24 terminates the lock state canceling process without canceling the lock state.

Thus, in the first embodiment, it is possible to represent an elapse of the first predetermined time period through a processes that the count objects Co1-Co4 gather around the first base object Bo1, and accordingly, it becomes possible for the user to easily grasp a time period until the lock state is canceled.

In addition, in the first embodiment, a shape of each of the first base object Bo1 and the count objects Co is a circle, but may be a polygon such as a rectangular, a triangle or the like. The first base object Bo1 and the count objects Co are not limited to white color and yellow color, and other colors may be utilized.

In the above-described embodiment, in a case that an operation of the slide is performed while the touch is maintained prior to the first predetermined time period elapses, since it is determined that the touch is maintained, the position of the first base object Bo1 is not changed. However, in other embodiments, if an operation of the slide is performed, it may be determined that the touch is not maintained, and therefore, the displaying may be returned to the state shown in FIG. 3(A).

In FIG. 3(A), a character string urging a long-touch is represented in English, but various languages such as Japanese, Chinese, Korean and so on may be utilized.

Furthermore, in a case that it is not necessary to distinguish the first base object Bo1 from other base objects, the same is simply called as "base object Bo".

Second Embodiment

In the second embodiment, the base object Bo and the count objects Co are displayed by a line and character strings. In addition, a mobile phone 10 of the second embodiment is the same or similar to that of the first embodiment, and accordingly, a duplicate description such as for the electrical structure of the mobile phone 10, appearance, memory map of the RAM 34, flowchart, etc. is omitted.

Figure 7:
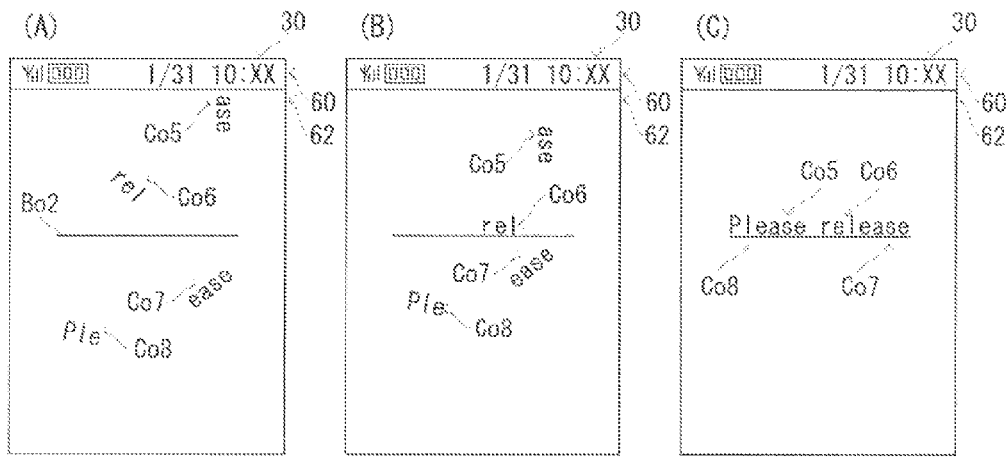
FIG. 7 is a view showing another example of procedure for canceling a lock state set in the mobile phone shown in FIG. 1.

With referring to FIG. 7(A)-FIG. 7(C), if the touch is detected in a state that the displaying of FIG. 3(A) is made, as shown in FIG. 7(A), a second base object Bo2 is indicated by a line and count objects Co5-Co8 are indicated by character strings. Then, if the touch is maintained, as shown in FIG. 7(B), the count objects Co5-Co8 move toward the second base object Bo2. The count object Co that a distance between the second base object Bo2 is equal to or less than a predetermined value becomes to be displayed along with the second base object Bo2. For example, as shown in FIG. 7(B), a displaying position of the count object Co6 (rel) is changed and thus the distance to the second base object Bo2 becomes equal to or less than the predetermined value, and therefore, the count object Co6 is displayed along with the second base object Bo2.

Furthermore, with referring to FIG. 7(C), when the first predetermined time period elapses after the touch is performed, the count objects Co5-Co8 are displayed along with the second base object Bo2. At this time, a term (Please release) urging to release the touch becomes to be displayed on the display 30 as the completion image by the count objects Co5-Co8. Then, if the touch is released from the touch panel 38 within the second predetermined time period in a state that the displaying shown in FIG. 7(C) is made, the lock state is canceled.

In the lock state canceling process shown in FIG. 6, if the processing in the steps S25 and S27 are executed, the displaying of the display 30 becomes the state shown in FIG. 7(A). If the processing of the step S29 is executed, the displaying of the display 30 is changed to the state of FIG. 7(B), and if the processing of the step S35 is executed, the displaying of the display 30 becomes the state of FIG. 7(C).

Thus, in the second embodiment, it is possible to represent an elapse of the first predetermined time period by a situation that the characters gather. Since the character string urging to release the touch is displayed when the first predetermined time period elapses, convenience increases in the operation for canceling the lock state.

In addition, a position where the second base object Bo2 is displayed may be settled on the basis of the touch point or may be coordinates set in advance. Furthermore, in order to simplify the processing, positions where the count objects Co5-Co8 are displayed may be moved toward the second base object Bo2 with the same positions and the same passes every time. In such a case, the moving speed is calculated based on the first predetermined time period being set.

In the above-described embodiment, the character string urging to release the touch is indicated in English, but various languages such as Japanese, Chinese, Korean, etc. may be utilized.

Third Embodiment

In the third embodiment, an elapse of time is indicated by a common object CMo which has natures of the base object Bo and the count object Co. In addition, a mobile phone 10 of the third embodiment is the same or similar to that of the first embodiment, and accordingly, a duplicate description such as for the electrical structure of the mobile phone 10, appearance, memory map of the RAM 34, flowchart, etc. is omitted.

With referring to FIG. 8(A)-FIG. 8(C), if the touch is detected in a state that the displaying of FIG. 3(A) is made, as shown in FIG. 8(A), a first common object CMo1 is shown by a numeral ("5", for example) based on the touch point. If the touch is maintained, the numeral shown by the first common object CMo1 counts-down. With referring to FIG. 8(B), for example, the first common object CMo1 is changed from the numeral "5" to "4".

Further, with referring to FIG. 8(C), if the first predetermined time period elapses after the touch is performed, the first common object CMo1 becomes the numeral "0", whereby it is indicated that the first predetermined time period elapses. Then, if the touch is released from the touch panel 38 within the second predetermined time period in a state that a completion image shown in FIG. 8(C) is being displayed, the lock state is canceled.

In the lock state canceling process shown in FIG. 6, if the processing in the steps S25 and S27 are executed, the displaying of the display 30 becomes the state shown in FIG. 8(A). If the processing of the step S29 is executed, the displaying of the display 30 is changed to the state of FIG. 8(B), and if the processing of the step S35 is executed, the displaying of the display 30 becomes the state of FIG. 8(C).

Thus, in the third embodiment, it becomes possible for the user to more clearly grasp the elapse of time because the process that the first predetermined time period elapses is represented by a change of numeral.

In the above-described embodiment, the Arabic numeral is utilized, but various kinds of numerals such as a Chinese numeral, a Roman numeral, etc. may be utilized. Furthermore, in other embodiments, the numeral may be counted up.

Furthermore, in a case that it is not necessary to distinguish the first common object CM1 from other common objects described later, the same is simply called as "common object CMo".

Fourth Embodiment

In the fourth embodiment, a common object CMo representing an elapse of time is indicated by a plurality of images. In addition, a mobile phone 10 of the fourth embodiment is the same or similar to that of the first embodiment, and accordingly, a duplicate description such as for the electrical structure of the mobile phone 10, appearance, memory map of the RAM 34, flowchart, etc. is omitted.

With referring to FIG. 9(A)-FIG. 9(C), if the touch is detected in a state that the displaying of FIG. 3(A) is made, as shown in FIG. 9(A), nine (9) circles are displayed as second common objects CMo2. If the touch is maintained, an image indicated by the second common objects CMo2 are non-displayed one by one. For example, with referring to FIG. 9(B), the number of the second common objects CMo2 is changed from "9" to "4" according to the elapse of time. Furthermore, with referring to FIG. 9(C), if the first predetermined time period elapses after the touch is detected, as a completion image, nine (9) circles each represented by a frame of a dotted line are displayed. That is, it is indicated that all the circles disappear. Then, if the touch is released within the second predetermined time period in a state that the displaying shown in FIG. 9(C) is being made, the lock state of the mobile phone 10 is canceled.

In the lock state canceling process shown in FIG. 6, if the processing in the steps S25 and S27 are executed, the displaying of the display 30 becomes the state shown in FIG. 9(A). If the processing of the step S29 is executed, the displaying of the display 30 is changed to the state of FIG. 9(B), and if the processing of the step S35 is executed, the displaying of the display 30 becomes the state of FIG. 9(C).

Thus, in the fourth embodiment, not utilizing characters, by changing the number of the images displayed, an elapse of time can be represented. Therefore, irrespective of countries or nations, it is possible to apply common recognition to various people.

A circle is utilized as an image in the above-described embodiment, but it is needless to say that a polygon such as a rectangular or triangle, an arbitrary defined mark or the like may be utilized. Furthermore, the number of the images may not be nine (9), if the change of time can be represented.

Fifth Embodiment

In the fifth embodiment, a common object CMo is indicated by an image of a clock. In addition, a mobile phone 10 of the fifth embodiment is the same or similar to that of the first embodiment, and accordingly, a duplicate description such as for the electrical structure of the mobile phone 10, appearance, memory map of the RAM 34, flowchart, etc. is omitted.

With referring to FIG. 10(A)-FIG. 10(C), if the touch is detected in a state that the displaying of FIG. 3(A) is made, as shown in FIG. 10(A), as a third common object CMo3, an analog clock is displayed. If the touch to the touch panel 38 is maintained, the displaying of the analog clock shown as the third common object CMo3 is changed. With referring to FIG. 10(B), for example, an area between twelve o'clock and three o'clock in the analog clock is filled by slant lines. If the touch is maintained for the first predetermined time period, as shown in FIG. 10(C), an inside of the analog clock is entirely filled by slant lines. Then, if the touch by the user is released within the second predetermined time period in a state that a completion image shown in FIG. 10(C) is being displayed, the lock state of the mobile phone 10 is canceled.

In the lock state canceling process shown in FIG. 6, if the processing in the steps S25 and S27 are executed, the displaying of the display 30 becomes the state shown in FIG. 10(A). If the processing of the step S29 is executed, the displaying of the display 30 is changed to the state of FIG. 10(B), and if the processing of the step S35 is executed, the displaying of the display 30 becomes the state of FIG. 10(C).

Thus, in the fifth embodiment, as similar to the fourth embodiment, it is possible to indicate an elapse of time without utilizing characters.

In addition, a shape of the analog clock is not limited to a circle, and a polygon such as a rectangular may be utilized.

Sixth Embodiment

In the sixth embodiment, a common object CMo is represented by an image of a door. In addition, a mobile phone 10 of the sixth embodiment is the same or similar to that of the first embodiment, and accordingly, a duplicate description such as for the electrical structure of the mobile phone 10, appearance, memory map of the RAM 34, flowchart, etc. is omitted.

With referring to FIG. 11(A)-FIG. 11(C), if the touch is detected in a state that the displaying of FIG. 3(A) is made, as shown in FIG. 11(A), as a fourth common object CMo4, a door with knob is displayed. If the touch to the touch panel 38 is maintained, the displaying of the door is changed. With referring to FIG. 11(B), for example, the door starts opening while the knob rotates. If the first predetermined time period elapses while the touch is maintained, as shown in FIG. 11(C), a completion image of a state that the door is felly opened is displayed. Then, if the touch by the user is released within the second predetermined time period in this state, the lock state of the mobile phone 10 is canceled.

In the lock state canceling process shown in FIG. 6, if the processing in the steps S25 and S27 are executed, the displaying of the display 30 becomes the state shown in FIG. 10(A). If the processing of the step S29 is executed, the displaying of the display 30 is changed to the state of FIG. 10(B), and if the processing of the step S35 is executed, the displaying of the display 30 becomes the state of FIG. 10(C).

Thus, in the sixth embodiment, as similar to the fourth embodiment and the fifth embodiment, it is possible to indicate an elapse of time without utilizing characters.

In addition, in FIG. 11(A)-FIG. 11(C), the common object CMo is an image of a door, but the same may be an image of double doors, an image of a sliding door or the like. Furthermore, it is possible to more clearly indicate that the lock state is canceled by displaying an image that a door is opened after a key is inserted into a key hole.

As understood from the above-described description, the user can intuitively get to know a time that the touch is maintained by such an object, and therefore, it is possible to increase an operability for canceling the lock state.

In addition, the objects shown in the first embodiment through the sixth embodiment may be arbitrarily selected by the user. Furthermore, each of the base objects Bo, count objects Co, and common objects CMo is changed according to an elapse of time, and thus, may be called as "changing object".

The displaying of the base object Bo may be non-displayed in a manner that the image indicating the base object Bo is gradually faded, or in a manner that a size of the base object Bo is gradually made smaller, or may be non-displayed by utilizing an animation that the base object Bo flies out of the screen.

The first predetermined time period and the second predetermined time period may be changed by the user. In addition, it may be notified to the user by a vibration, a light or a sound that the completion image becomes to be displayed.

Seventh Embodiment

In the seventh embodiment, a touch operation for canceling the lock state is urged by a displaying of an object To. In addition, a mobile phone 10 of the seventh embodiment is the same or similar to that of the first embodiment, and accordingly, a duplicate description such as for the electrical structure of the mobile phone 10, appearance, etc. is omitted.

With referring to FIG. 12(A), in a lock screen displayed in the function displaying area 62, a longitudinal object To is displayed. The object To is indicated by an image looking like a tape, and defined by a predetermined first function and a predetermined second function. An upper boundary line La and a lower boundary line Lb which indicate boundaries between the object To and a background correspond to the first function and the second function. Then, it is possible for the user to cancel the lock state by touching the touch panel 38 and then sliding such that a locus intersects with the object To. Hereinafter, in a case it is not necessary to especially distinguish the upper boundary line La and the lower boundary line Lb from each other, these are called as "boundary line L", and in a case that it is not necessary to especially distinguish the first function and the second function from each other, these are called as "function".

With referring to FIG. 12(B), if the current touch position becomes to exist on the upper boundary line La when the user performs the slide, the object To is changed to a first displaying state where there is a break in the object. That is, if it becomes a state that a finger of the user is brought into contact with the object To, the object To is displayed in a manner that the break is formed in the object by the slide, whereby the user can know that the touch operation for canceling the lock state is effective.

Next, with referring to FIG. 12(C), if the slide is further performed, and the current touch position becomes to exist on the lower boundary line Lb, the object To is changed to a second displaying state where the object To is separated into a first object To a and a second object Tob. That is, if the slide by the user completely intersects with the object To, the object To is displayed in a manner that it is broken by the slide. In addition, the displaying of the object To separated into two pieces is non-displayed after the predetermined time period (one (1) second, for example). Then, the displaying of the object To disappears and the lock state is canceled, and as shown in FIG. 12(D), a standby image indicative of a standby state is displayed on the display 30. Therefore, the user can get to know that the operation for canceling the lock state is normally ended by seeing the object To in the second displaying state.

In the seventh embodiment, a contact of the finger with respect to the upper boundary line La and the lower boundary line Lb is determined by substituting the coordinates indicating the current touch position into the functions corresponding to the respective boundary lines. For example, if the first function is established by the coordinates indicative of the current touch position, it is determined that the finger of the user is brought into contact with the upper boundary line La. If the second function is established by the coordinates indicative of the current touch position, it is determined that the finger of the user is brought into contact with the lower boundary line Lb. Then, in the seventh embodiment, when the first function and the second function both are established by the coordinates of the touch position that is changed by the slide, the lock state is canceled.

Thus, in the seventh embodiment, by utilizing the two functions for canceling the lock state, it is possible to prevent the lock state from being canceled by an erroneous operation. Furthermore, since the object To is defined by the predetermined functions, it is possible to easily determine an intersection between the object To and the slide based on the predetermined functions.

In addition, if the touch is released in a state that the first function is established, the object To is returned from the first displaying state shown in FIG. 12(B) to the displaying state shown in FIG. 12(A).

In a case that the touch point is included in the displaying range of the object To, the touch is made invalid. That is, in a case that the slide is restarted from an inside of the object To, even if the finger touches each of the boundary lines, the displaying state of the object To is never changed, and the lock state is not canceled. Then, when such an operation is performed, it may be notified to the user that an operation is wrong.

The position where the object To is displayed is not limited to the position shown in FIG. 12(A) as far as the slide intersecting with the object To is performed.

A position of the break shown in FIG. 12(B) is displayed corresponding to the touch position. That is, a center of the break is displayed to be matched to the position that the touch position is brought into contact with the object To. However, in other embodiments, the break may be displayed with no relation to the position that the touch position is brought into contact with the object To. The break of the object To may be changed in accordance with the touch position. For example, a distance of the slide is shorter, the break is displayed smaller, and the longer distance of the slide, the larger the break.

Furthermore, in other embodiments, the lower boundary line Lb may correspond to the first function and the upper boundary line La may correspond to the second function. Then, the lock state is canceled by a downward slide in the above-described embodiment, but in such a case, the lock state becomes to be canceled by an upward slide. In this case, if the touch position becomes to exist on the lower boundary line Lb, the break shown in FIG. 12(B) is displayed reversely up and down. However, in other embodiments, an erroneous operation may be prevented by defining an order that the functions are established. For example, in other embodiments, if the downward slide is performed, even if the locus of the slide intersects with the object To, it is possible to render the lock state not to be canceled.

Figure 13:
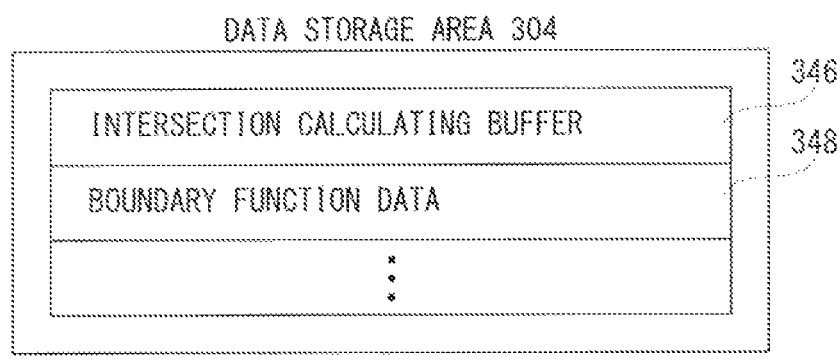
FIG. 13 is a view showing an example of other data stored in a data storage area shown in FIG. 4.

FIG. 13 shows a part of the data storage area 304 of the RAM 34 in the seventh embodiment. In the data storage area 304 in the seventh embodiment, an intersection calculating buffer 346, etc. are further provided, and boundary function data 348, etc. are further stored. The intersection calculating buffer 346 is a buffer utilized at a time that a calculation that the coordinates of the current touch position indicated by the slide is substituted into the first function and the second function is performed. The boundary function data 348 is data indicating the first function corresponding to the upper boundary line La and the second function corresponding to the lower boundary line Lb. In addition, the boundary function data 348 is modified according to a shape and a position of the object displayed on the display 30.

Figure 14:
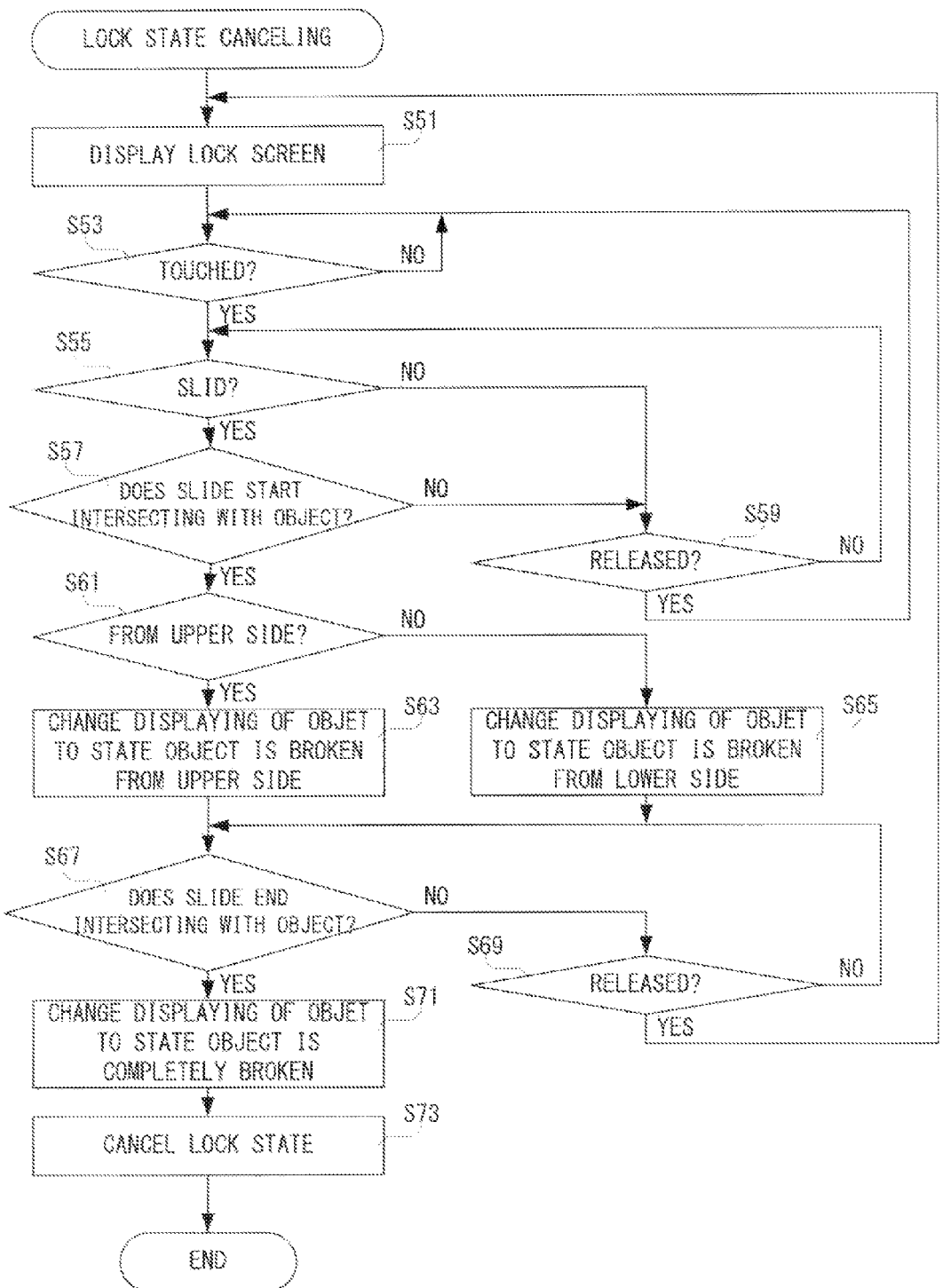
FIG. 14 is a flowchart showing another example of a lock state canceling process by the processor shown in FIG. 1.

The processor 24 processes a plurality of tasks including a lock canceling process according to the seventh embodiment shown in FIG. 14, etc., in parallel with each other under controls of Linux (registered trademark)-base OS such as Android (registered trademark) and REX, or other OSs.

FIG. 14 is a flowchart of a lock state canceling process. If the menu key 26b, for example is operated at a time that the lock state is being set, the processor 24 displays a lock screen in a step S51. That is, the processor 24 displays the lock screen shown in FIG. 12(A) on the display 30 after the processor 24 outputs an instruction for turning-on the power for the display 30. In addition, the processor 24 which performs the processing in the step S51 functions as a second object displaying portion.

Subsequently, the processor 24 determines whether or not the touch is performed in a step S53. That is, it is determined whether or not the touch is detected by the touch panel control circuit 36. If "NO" is determined in the step S53, that is, if the touch is not detected, the processor 24 repeatedly executes the step S53.

If "YES" is determined in the step S53, that is, if the touch is detected by the touch panel control circuit 36, in a step S55, the processor 24 determines whether or not the slide is performed. For example, the processor 24 reads the coordinates of the touch position detected last time and the coordinates of the touch position detected this time from the touch buffer 330, and determines whether or not the two coordinates are different from each other. If "NO" is determined in the step S55, that is, if the slide is not performed, the process by the processor 24 proceeds to a step S59. On the other hand, if "YES" is determined in the step S55, that is, if the slide is performed, in a step S57, the processor 24 determines whether or not the slide starts to intersect with the object To. For example, the processor 24 reads the coordinates indicating the current touch position from the touch buffer 330, and reads the first function and the second function from the boundary function data 348, and determines whether or not the first function or the second function can be established by the read coordinates. Then, at every time that the processing of the step S57 is executed, a calculating result is stored in the intersection calculating buffer 346.

If "NO" is determined in the step S57, for example, if the first function is not established by the coordinates indicative of the touch position because the current touch position is a position away from the object To, the processor 24 determines whether or not the slide is released in a step S59. That is, it is determined whether or not the finger is released from the touch panel 38. If "NO" is determined in the step S59, that is, if the touch panel 38 is continued to be touched, the process by the processor 24 returns to the step S55. If "YES" is determined in the step S59, that is, if the finger is released from the touch panel 38, the processor by the processor 24 returns to the step S53.

If "YES" is determined in the step S57, that is, the current touch position exists on the upper boundary line La or the lower boundary line Lb of the object To, the processor 24 determines whether or not the slide starts to intersect with the object To from an upper side. That is, the processor 24 determines whether or not the first function corresponding to the upper boundary line La is established by the coordinates indicative of the current touch position. If "YES" is determined in the step S61, for example, if the slide starts to intersect with the object To from an upper side as shown in FIG. 12(B), in a step S63, the processor 24 changes the displaying of the object To to a state (the first displaying state) that the object To is broken from an upper side, and then, the process by the processor 24 proceeds to a step S67. For example, the processor 24 displays on the display 30 the object To that the break from the upper side is formed as shown in FIG. 12(B).

If "NO" is determined in the step S61, that is, if the second function corresponding to the lower boundary line Lb is established by the coordinates indicative of the current touch position, in a step S65, the processor 24 changes displaying of the object To to a state that the object To is broken from a lower side (the first displaying state) and then, the process by the processor 24 proceeds to a step S67. That is, the processor 24 displays on the display 30 the object To formed with a break from the lower side. In addition, the processor 24 which performs the processing of the step S63 or the step S65 functions as a first changing portion.

Subsequently, the processor 24 determines whether or not the slide completely intersects with the object To in the step S67. For example, if the first function corresponding to the upper boundary line La has been established, the processor 24 determines whether or not the second function corresponding to the lower boundary line Lb can be established by the coordinates indicative of the current touch position. In addition, the processor 24 which performs the processing of the steps S57 and S67 functions as a second determining portion. Especially, the processor 24 which performs the processing of the step S57 functions as a third determining portion, and the processor 24 which performs the processing of the step S67 functions as a fourth determining portion.

If "NO" is determined in the step S67, that is, if the second function corresponding to the lower boundary line Lb is not established by the coordinates indicative of the touch position, for example, the processor 24 determines whether or not the release is performed in a step S69. That is, the processor 24 determines, as similar to the step S59, whether or not the finger is released from the touch panel 38. If "NO" is determined in the step S69, that is, if the current touch position is included within the displaying range of the object To, the process by the processor 24 returns to the step S69. If "YES" is determined in the step S69, that is, if the slide is discontinued prior to the locus of the slide completely intersecting with the object To, the process by the processor 24 returns to the step S51. For example, if the object To is in the first displaying state shown in FIG. 12(B), the object To is returned to the state shown in FIG. 12(A).

Furthermore, if "YES" is determined in the step S67, that is, if the second function corresponding to the lower boundary line Lb is established by the current touch position, for example, the processor 24 changes in a step S71, the displaying of the object To to a state that the object To is completely broken (the second displaying state). That is, the processor 24 displays two divided objects Toa and object Tob as shown in FIG. 12(C). In addition, the processor 24 which performs the processing of the step S71 functions as a second changing portion.

Next, the processor 24 cancels the lock state in a step S73, and then, terminates the lock state canceling process. That is, the processor 24 turns-off the lock flag 338. In addition, the processor 24 which performs the processing of the step S73 functions as a second canceling portion.

As understood from the above description, since the touch operation for canceling the lock state is urged by the displaying of the object To, it is possible to inform the user of a lock state canceling method irrespective of the language the user utilizes.

Figure 15:
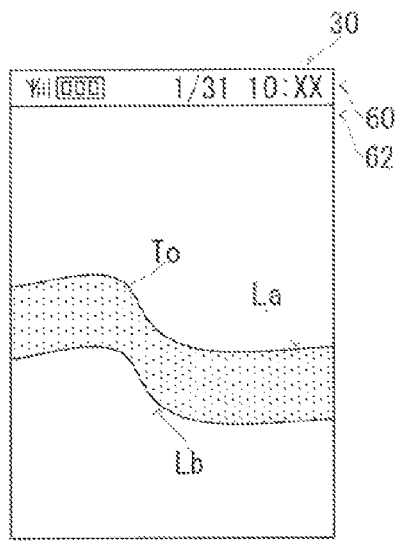
FIG. 15 is an illustrative view showing an example of an object displayed on a display shown in FIG. 1.
Figure 16:
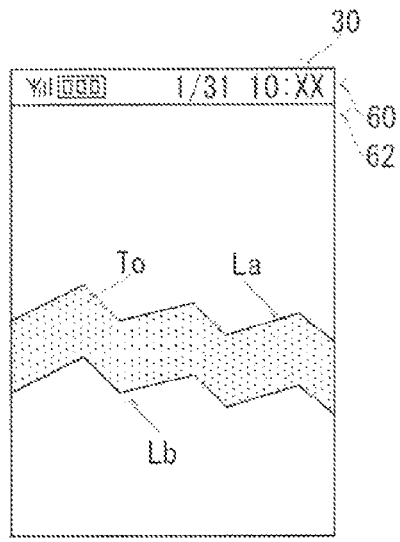
FIG. 16 is an illustrative view showing another example of an object displayed on a display shown in FIG. 1.

In addition, in the seventh embodiment, the boundary line L of the object To is represented by a straight line, but in other embodiments, such a boundary line may be a curved line or may include a vertex. That is, a function corresponding to each boundary line L is not limited to a primary function, and the boundary line may be represented by various kinds of functions. For example, if the boundary line L is a curved line as shown in FIG. 15, a cubic function or a trigonometric function such as a sine, cosine or the like corresponds to the boundary line L. Furthermore, if the boundary line L is a triangular wave having a plurality of vertices, for example, a triangular function can be applied to the boundary line L.

Figure 17:
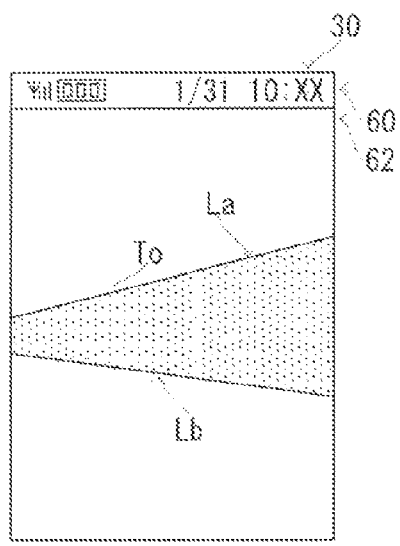
FIG. 17 is an illustrative view showing yet another example of an object displayed on a display shown in FIG. 1.

Furthermore, the two boundary lines L constituting the object To may not be in parallel with each other. For example, two functions having an intersection are applied to two boundary lines L such as an upper boundary line La and a lower boundary line Lb shown in FIG. 17.

In other embodiments, the object To may not be a tape or belt-like, and may be indicated by a figure such as a triangle, circle or the like.

In other embodiments, a plurality of objects To may be displayed. In a case that a plurality of objects To are displayed, if the slide is performed so as to intersect with all the objects To, the lock state is canceled. With referring to FIGS. 18(A)-(E), for example, on the display 30, an object To1 and an object To2 are displayed. An upper boundary line La and a lower boundary line Lb of each of the object To are defined by the first function and the second function.

Figure 18:
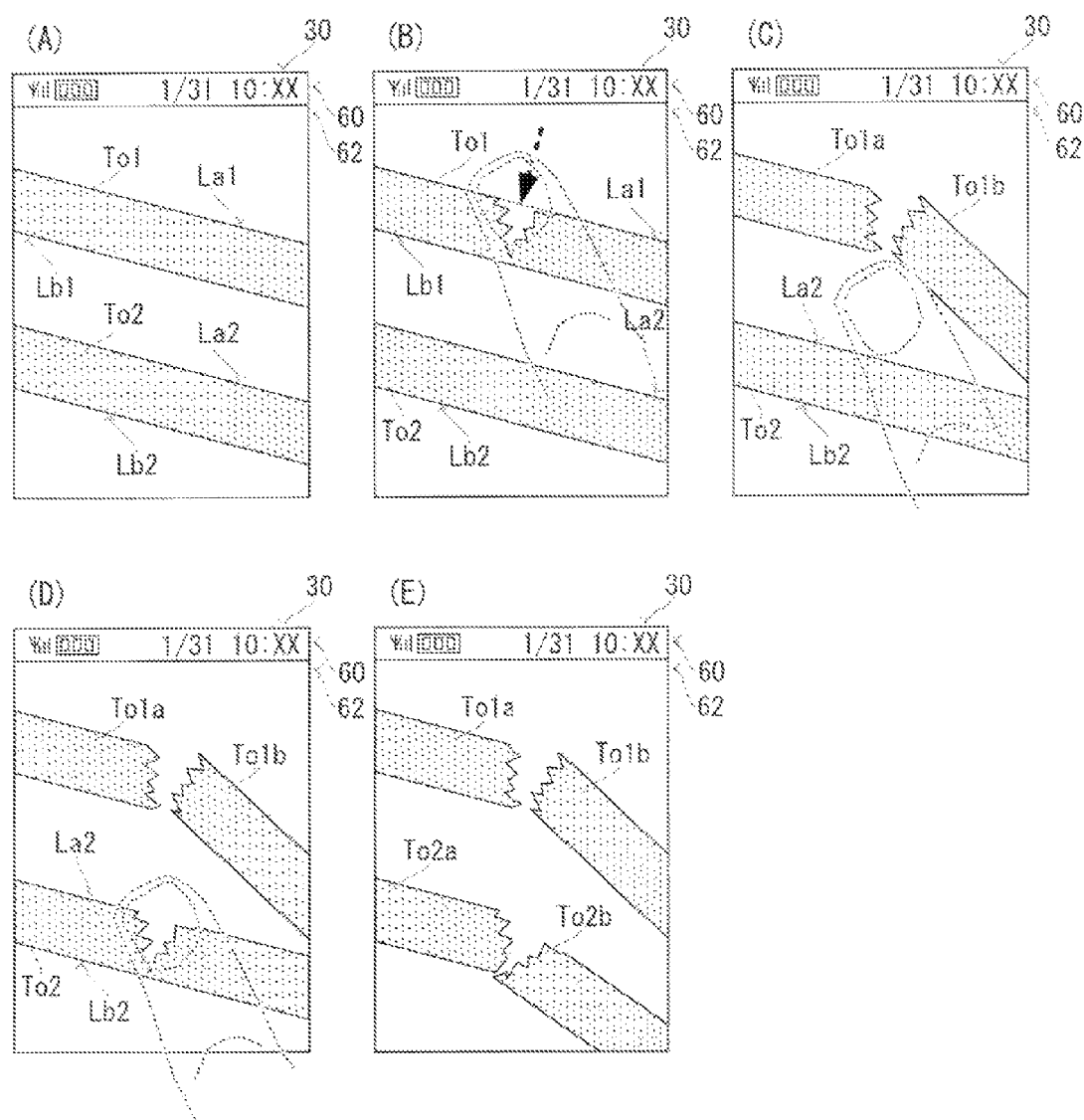
FIG. 18 is an illustrative view showing a further example of procedure for canceling a lock state set in the mobile phone shown in FIG. 1.

Next, as shown in FIG. 18(B), if the position of the slide is brought into contact with the upper boundary line La1, a break is formed in the object To1. If the slide is further continued and thus the current touch position is brought into contact with the lower boundary line Lb1, the object To1 is divided into an object To1a and an object To1b as shown in FIG. 18(C).

If the user further continues to perform the slide while the finger is not released, as shown in FIG. 18(D), a break is formed in the object To2, and then, as shown in FIG. 18(E), the object To2 is divided into an object To2a and an object To2b. Then, when a displaying becomes such that the two objects To are both broken, the lock state is canceled.

Thus, in a case that the two objects To are simultaneously displayed, only when the slide operation is performed to be intersected all objects To, the lock state is canceled.

In addition, in a state of FIG. 18(C), the displaying of the two divided objects To may be non-displayed such that it is notified that the operation by the user is being performed correctly. Furthermore, in the displaying of FIG. 18(C), if the slide is never moved or if the slide is released, there is a high possibility of an erroneous operation, and therefore, the displaying of the two objects To is returned to the state of FIG. 18(A).

In other embodiments, in order to clearly show that the lock state is set, in the lock screen, the object To may be displayed over the standby screen shown in FIG. 12(D). In such a case, even if the user first utilizes the mobile phone 10, irrespective of the language used by the user, it becomes easy to perform the slide to the object To.

In other embodiments, an icon indicating cutlery such as scissors, knife or the like is displayed corresponding to a position the user touches, and the slide to the object To may be urged.

Furthermore, a communication system of the mobile phone 10 in the embodiments is a CDMA system, but an LTE (Long Term Evolution) system, a W-CDMA system, a GSM system, a TDMA system, a FDMA system, a PHS system or the like may be adopted. Furthermore, as the display 30, an LCD monitor is utilized, but an organic EL panel or the like may be adopted.

The lock state setting program 310 and the lock state canceling program 312 may be stored in a HDD of the server for data distribution, and distributed to the mobile phone 10 via the network. These programs may be stored in a storage medium such as an optical disk of CD, DVD, BD (Blu-ray Disc) or the like, a USB memory, a memory card, etc. and then, such the storage medium may be sold or distributed. In a case that the lock state setting program 310 and the lock state canceling program 312 downloaded via the above-described server or storage medium are installed to a mobile phone having the structure equal to the structure of the embodiment, it is possible to obtain advantages equal to advantages according to the embodiment.

Furthermore, the above-described embodiments may be adapted not only to the mobile phone 10 but also so-called a smartphone, an electronic book terminal, a tablet PC, a PDA (Personal Digital Assistant) and so on.

The specific numerical value mentioned in this specification such as the first predetermined time period, the second predetermined time period, the predetermined time period, etc. are only examples, and changeable properly in accordance with the change of product specifications.

Although the present invention has been described and illustrated in detail, it is clearly understood that the same is by way of illustration and example only and is not to be taken by way of limitation, the spirit and scope of the present invention being limited only by the terms of the appended claims.

DESCRIPTION OF NUMERALS

10 denotes a mobile phone,
12 denotes an antenna,
14 denotes a wireless communication circuit,
24 denotes a processor,
26 denotes a key input device,
34 denotes a RAM,
36 denotes a touch panel control circuit, and
38 denotes a touch panel.

The invention claimed is:

1. A portable terminal having a touch panel and a touch operation detecting portion which detects a touch operation and capable of setting a lock state where predetermined processing based on a touch detected by the touch operation detecting portion is not performed, comprising:
    a displaying portion which performs displaying of an object for canceling the lock state when the lock state is set;
    a determining portion which determines whether or not a touch operation by which the object is changed to predetermined displaying is performed with respect to the object; and
    a canceling portion which cancels the lock state when it is determined by the determining portion that the touch operation by which the object is changed to the predetermined displaying is performed,
    wherein the determining portion includes a second determining portion which determines whether or not the touch operation intersecting with the object is performed to the touch panel,
    wherein the canceling portion includes a second canceling portion which cancels the lock state when it is determined that the touch operation intersecting with the object is performed to the touch panel by the second determining portion,
    wherein the object is defined by a first function and a second function,
    wherein the second determining portion includes a third determining portion which determines whether or not the first function is established by coordinates indicated by the touch operation intersecting with the object to the touch panel and a fourth determining portion which determines whether or not the second function is established by coordinates indicated by the touch operation intersecting with the object to the touch panel, and
    wherein the second canceling portion cancels the lock state when it is determined that the second function is established by the coordinates indicated by the touch operation intersecting with the object to the touch panel by the fourth determining portion after it is determined that the first function is established by the coordinates indicated by the touch operation intersecting with the object to the touch panel by the third determining portion.

2. A mobile terminal according to claim 1, further comprising a first changing portion which changes the object to a first displaying state when it is determined that the first function is established by the coordinates indicated by the touch operation intersecting with the object to the touch panel by the third determining portion.

3. A mobile terminal according to claim 2, further comprising a second changing portion which changes the object to a second displaying state when it is determined that the second function is established by the coordinates indicated by the touch operation intersecting with the object to the touch panel by the fourth determining portion.

* * * * *